April 9, 1968
I. SINGER
3,376,599
MOUNTING ARRANGEMENT FOR INSULATED BULKHEAD OR THE LIKE
Filed Oct. 15, 1965
2 Sheets-Sheet 1
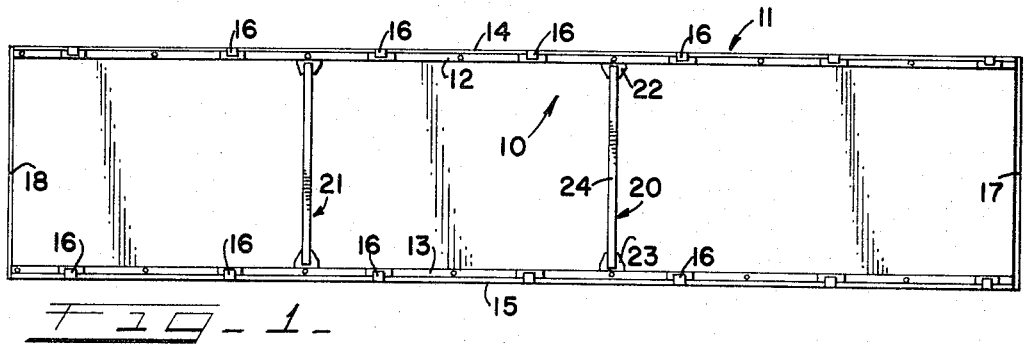
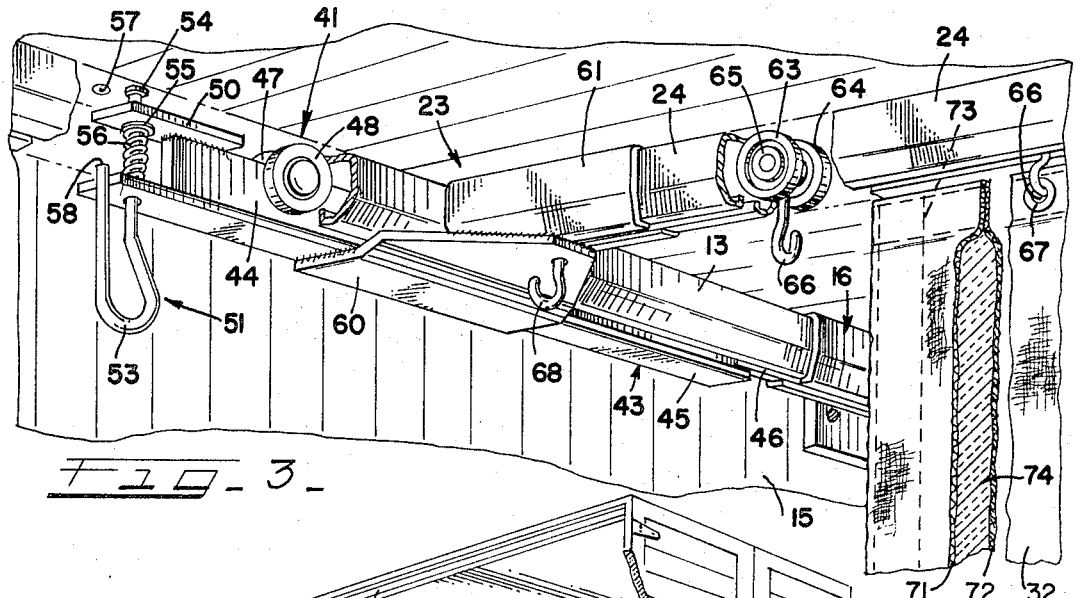
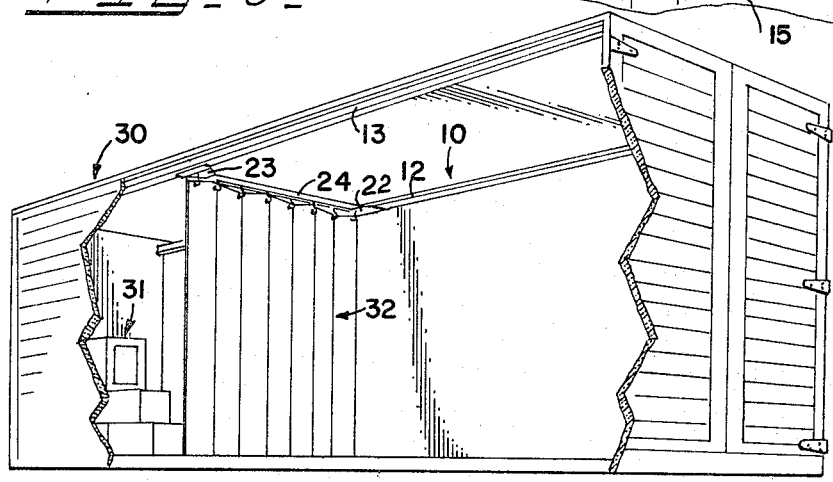
INVENTOR
ISADORE SINGER
BY Greist, Lockwood,
Greenawalt & Dewey ATT'YS

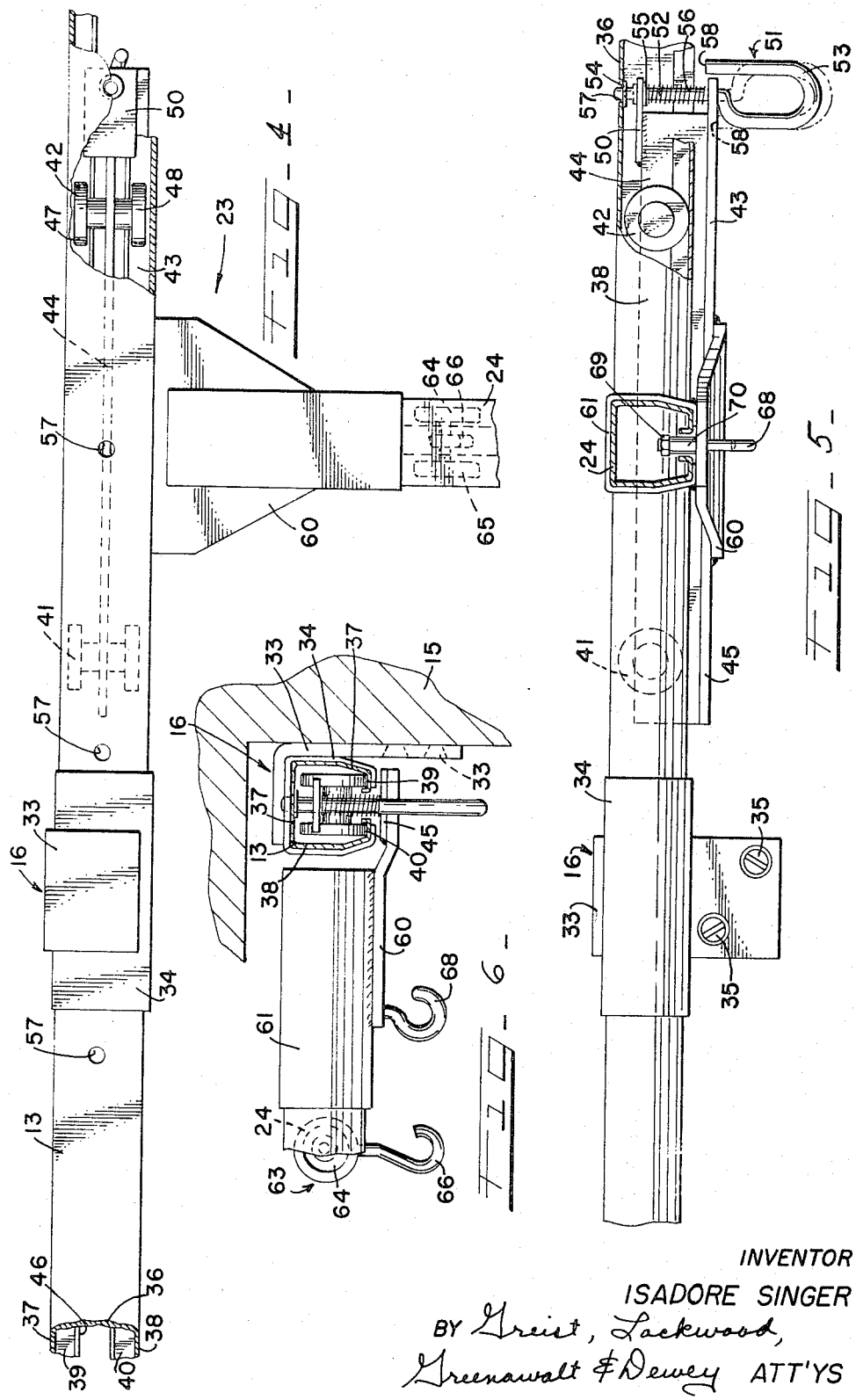

United States Patent Office 3,376,599
Patented Apr. 9, 1968

3,376,599
MOUNTING ARRANGEMENT FOR INSULATED BULKHEAD OR THE LIKE
Isadore Singer, Chicago, Ill., assignor to Singer Safety Products, Inc., Chicago, Ill., a corporation of Illinois
Filed Oct. 15, 1965, Ser. No. 496,636
6 Claims. (Cl. 16—87.6)

ABSTRACT OF THE DISCLOSURE

A movable insulated bulkhead including parallel and longitudinally extending tracks, each having T-shaped trolleys mounted thereon. The trolleys support a transversely extending rail which receives rollers supporting the movable bulkhead consisting of a foldable curtain. Locking means is provided to maintain said trolleys in any selected location along the tracks.

This invention relates to a means for mounting an insulated curtain, bulkhead, or the like. More specifically, this invention is directed to a new and improved carrier track arrangement particularly adapted for use in mounting insulated curtains for longitudinal and lateral movement in cargo carrying containers such as trailers, railway cars, and the like.

The present invention includes a carrier arrangement having longitudinally extending tracks mounted on parallel side walls of a cargo container. A transverse rail adapted to foldably support an insulated bulkhead is mounted on a rail extending between novel trolley assemblies which are carried on each of the tracks and movable to any selected location along the side wall, permitting the insulated bulkhead to be shifted to any selected location within the container. Suitable locking means is provided to maintain the insulated bulkhead so positioned. Through its use, the container may be sub-divided into several distinct cargo areas to reduce the total floor area and volume to be refrigerated. Cargo will also be kept cold during loading and unloading operations since the opening through which it passes may be minimized.

The present invention, through its simplified design, is economically manufactured while being extremely rugged to endure the expected abuse. It is designed for mounting adjacent the ceiling to avoid interfering with loading and unloading and occupying space normally not used for cargo. The salient features of the present invention and benefits and advantages derived will become better appreciated by a consideration of the objects achieved and a detailed description of a preferred form of the invention.

It is an object of this invention to provide a new and improved means for mounting an insulated curtain, bulkhead, or the like.

It is a further object of this invention to provide a new and improved trolley assembly for mounting an insulated curtain for movement longitudinally and transversely of a cargo container.

It is a still further object of this invention to provide spaced trolley assemblies joined by a transverse rail, with at least one of the trolley assemblies having locking means which permits the carrier ararngement composed of the two trolley assemblies and transverse rail to be locked at any desired location within the container.

Other objects and advantages will become apparent to the man in the art who studies the drawings and reads the description.

In the drawings:

FIG. 1 is a schematic plan view of the carrier arrangement of the present invention;

FIG. 2 is a broken away fragmentary perspective view of a container having the carrier arrangement of the present invention mounted therein;

FIG. 3 is an enlarged fragmentary perspective view of the carrier arrangement taken along one side of the container of FIG. 2;

FIG. 4 is a fragmentary top plan view partly in section of the trolley and track assembly forming the carrier arrangement shown in FIG. 3;

FIG. 5 is a front elevational view partly in section of the track and trolley assembly of FIG. 4 with portions broken away; and FIG. 6 is an end elevational view of the track and trolley of FIG. 4.

In the schematic view of FIG. 1, a carrier arrangement incorporating the features of the present invention is indicated generally by reference numeral 10 being disposed within a container indicated by reference numeral 11. The carrier arrangement 10 includes longitudinal tracks 12 and 13 disposed along the walls 14 and 15 of the container 11. The tracks 12 and 13 may extend continuously between opposite ends 17 and 18 of the container 11, and are mounted on the respective wall portions through a plurality of spaced bracket assemblies 16. Mounted on the tracks 12 and 13 for rolling movement within the container 11 are trolley carriers 20 and 21 which are of identical construction. Each trolley carrier 20 and 21 includes identical T-shaped trolley assemblies 22 and 23 respectively, which are carried in the tracks 12 and 13, respectively. A transverse rail member 24 extends between the trolley assemblies 22 and 23 and serves as a load bearing member to support an insulated cargo curtain, foldable bulkhead, or the like.

One typical application of the carrier arrangement 10 of FIG. 1 is shown in the fragmentary broken away perspective view of FIG. 2. A container 30 may consist of a closed semi-trailer, reefer or the like which is adapted to haul refrigerated cargo indicated at 31. An insulated curtain 32 is mounted on the transverse rail 24 which is supported by the trolley assemblies 22 and 23 which are longitudinally movable in the tracks 12 and 13. The curtain 32 may be easily moved from the rear of the trailer to the front and as is evident in FIG. 3 the insulated curtain 32 is positioned adjacent the cargo 31 to reduce the total volume of the container 30 that is needed to be refrigerated. During unloading operations, the curtain, which may be formed in two parts meeting at the center of the container 30, may be opened a sufficient distance to permit the food cartons forming the cargo 31 to pass between. While the container 30 is illustrated as a refrigerated trailer, it is to be understood that the invention is applicable to any type of container, refrigerator railway car, or enclosure in which the floor area is desired to be sub-divided and particularly where the volume of cargo is subject to change.

In the broken away perspective view of FIG. 3, a portion of the track 13 is illustrated being of generally channel-shape and is mounted by the bracket assembly 16 which surrounds the track and is fastened to the wall 15 by suitable means. As best seen in FIGS. 3–6, the mounting bracket 16 may include a mounting plate portion 33 and a track encompassing portion 34 with suitable fasteners 35 joining the mounting portion 33 to the side wall 15 of the container 11. The track encompassing portion 34 overlies the top 36 and side wall portions 37 and 38 of the track 13. The side wall portions 37 and 38 of the track 13 terminate in flanges 39 and 40 having upwardly bent ends forming track ways to receive spaced roller assemblies 41 and 42 serving to support the trolley assembly 23. Trolley assembly 23 also includes a T-shaped frame member 43 formed by a vertically disposed flange portion 34 and transverse flange 45. Each of the roller assemblies 41 and 42 are rotatably carried on the vertical flange 34 of the T-shaped frame 43 and serve to suspend the trolley assembly 23 for rolling movement within the associated track. The vertical flange 44 projects into the longitudinal opening 46 defined by the spaced inturned flanges 39 and 40. Roller assemblies 41 and 42 may be of any known form including wheel members 47 and 48 rotatably mounted on the flange 44 to permit longitudinal movement within the track assembly 13. They may be of such diameter so that they can engage the underside of the top web 36 of the track if the load is cantilevered on the rail 24.

Disposed at one end of the flange 44 is a plate 50 which may be welded or attached by any suitable means to the flange 44 to project outwardly therefrom. The transverse flange 45 also projects beyond the termination of the flange 44. The flange 45 and plate 50 are pierced to slidably mount a locking means 51 consisting of a locking pin portion 52 and handle portion 53. The locking pin portion 52 is provided with spaced apart collars 54 and 55 disposed on opposite sides of the plate 50 to limit the total longitudinal movement.

A biasing spring 56 has one end bottomed on the flange 45 and acts against the collar 55 to maintain it in abutting engagement with the plate 50 and keep the locking pin 52 extended. As illustrated, the free end of the locking pin portion 52 is received in an opening 57 formed in the transverse web 36 of the track 13 to fix the trolley against movement. A plurality of such openings may be provided at closed spaced intervals throughout the length of the track 13 to permit only location to be selected.

The handle 53 is formed with an upwardly projecting free end 58 which in the locked position extends above the flange 45. When the trolley 23 is to be unlocked for movement within the track 13, the handle 53 is pulled down and rotated one half turn to the position shown in phantom whereby the free end 58 will engage the underside of transverse flange 45 to keep the end of the locking pin portion 52 free of the holes 57 in the web 56. An identical locking arrangement may be provided on the trolley assembly 22 also.

A gusset plate 60 is welded or otherwise suitably attached beneath the transverse flange 45 and projects laterally towards the center of the container. The gusset plate 60 is provided with a socket forming member 61 welded along the top side of the gusset plate 60 with the inner end spaced from the side web 38 of the track 13. The socket forming member 61 receives the transverse track member 24 which is identical in shape to the track 13. Roller hook assemblies 63 having roller members 64 and 65 supporting a depending hook 66 are carried in the track 24 and support the curtain 32 through grommets 67 carried along the upper edge thereof. A fixed hook member 68 is joined to the gusset plate by means of a nut 69 and washer 70 and serves to support the outer end of the curtain in close proximity to the walls 14 and 15.

The curtain 32 is illustrated fragmentarily in FIG. 3 and comprises a sandwich formed by two neoprene coated nylon outer layers 71 and 72 with foam blocks interposed. The outer layers 71 and 72 are stitched as at 75 along the top and bottom margins and along the opposite sides of a block of polyurethane foam 74 which may be several inches thick. The stitching 73 around the individual polyurethane foam blocks divides the curtain into a plurality of semi-rigid panels having a reduced thickness on opposite sides of the block 74. In this manner a natural pleat or fold line is formed which permits the panels to naturally fold in an accordion manner when the curtains are pushed apart. The curtain may be continuous between the sides of the container or in the preferred form consists of two multipanel curtains which meet at the longitudinal center line of the container 30. Obviously, other types of materials for the curtain may be used.

It is to be appreciated that the trolley carrier arrangement of the present invention permits cold storage floor areas, such as the container shown, to be subdivided into a plurality of smaller floor areas to minimize the total volume to be cooled. Where the volume of refrigerated goods is diminishing as by partial unloading in a reefer, the insulated bulkhead or curtain may be moved up towards the front of the truck as unloading occurs. During unloading, the curtains may be spaced only a sufficient distance to allow the cartons to pass therethrough with significant reduction in the loss of cold air. During lulls in unloading, they may be easily closed. The curtain and trolley assembly is lightweight so as to not add significantly to the dead weight if used in vehicles, trailers, and the like, and is mounted adjacent the ceiling so as to not interfere with use of the vehicle for other purposes.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:
1. Means for mounting an insulated curtain, bulkhead or the like in a movable manner within a closed container, said mounting means comprising a pair of longitudinal track means extending along oppositely facing generally parallel wall portions, each of said longitudinal track means being of generally channel-shape in cross section and being fixed to said wall portions at spaced intervals, a generally T-shaped trolley means slidably carried in each of said track means, a transversely extending track joining said T-shaped trolley means and means on each of said trolleys cooperating with means provided on said transverse track to support a foldable insulated curtain, and locking means on at least one of said trolley means to control the positioning on said longitudinal track.

2. The means for mounting an insulated bulkhead or the like of claim 1 wherein said means on said transverse track to support a curtain comprises roller mounted hook members adapted for confined rolling movement within said transverse track.

3. A T-shaped trolley assembly adapted for use in mounting a foldable curtain member for longitudinal movement within a container, said trolley assembly comprising a longitudinally extending generally T-shaped frame having a vertical flange portion thereof disposed for positioning in a track means, wheel means rotatably carried on said vertical flange and adapted for reception in said track for movement longitudinally thereof, gusset plate means joined to said T-shaped frame and projecting laterally therefrom, socket means on said gusset plate means to support a rail extending at generally right angles to said frame and locking means on said frame adapted to cooperate with holes formed in said track means.

4. A T-shaped trolley assembly adapted for use in mounting a transversely foldable curtain member for longitudinal movement within a container, said trolley assembly comprising a longitudinally extending inverted T-shaped support having a vertically disposed flange adapted for positioning in a track means, wheel means rotatably carried on said vertically disposed flange and adapted for reception in said track means for movement longitudinally thereof, gusset plate means joined to said inverted T-shaped support at the lower end thereof and projecting laterally therefrom and means on said gusset plate means to support a curtain supporting rail extending at generally right angles to said flange and locking means disposed on said inverted T-shaped support, said locking means being adapted for reception into holes formed in said track means to lock said trolley assembly against movement.

5. A curtain support assemby for movement along generally parallel tracks, said support assembly comprising, in combination, a pair of T-shaped trolley assemblies, each of said assemblies comprising a longitudinally extending, generally T-shaped frame having a vertical flange portion thereof disposed for positioning in track means, wheel means rotatably carried on said vertical flange and adapted for reception in said track for movement longitudinally thereof, gusset plate means joined to said T-shaped frame and projecting laterally therefrom, socket means on said gusset plate means for supporting a rail extending at generally right angles to said frame, locking means on said frame adapted to cooperate with holes formed in said track means for locking said trolley assembly against movement, and curtain supporting track means attached to and extending between said socket means on each trolley assembly, joining said trolley assemblies together into a unitary curtain support assembly.

6. A curtain support assembly as defined in claim 5 which also includes a plurality of curtain supporting holder means movably mounted in said curtain supporting track means.

References Cited

UNITED STATES PATENTS

| | | | |
|---|---|---|---|
| 1,758,580 | 5/1930 | Moore | 212—18 |
| 2,227,807 | 1/1941 | Dixon | 105—376 |
| 2,753,588 | 7/1956 | Grosh | 16—95 |

MARVIN A. CHAMPION, *Primary Examiner.*

J. H. McGLYNN, *Assistant Examiner.*